United States Patent [19]
> Posnansky

[11] Patent Number: 5,067,475
[45] Date of Patent: Nov. 26, 1991

[54] RADIATION SHIELD

[75] Inventor: Mario Posnansky, Bern, Switzerland

[73] Assignee: Atlantis Energie AG, Bern, Switzerland

[21] Appl. No.: 561,326

[22] Filed: Aug. 1, 1990

[30] Foreign Application Priority Data

Aug. 11, 1989 [CH] Switzerland ............ 2949/89

[51] Int. Cl.⁵ .................................. F24J 3/02
[52] U.S. Cl. .................... 126/418; 126/441; 126/449; 126/450; 126/417; F24J/3/02
[58] Field of Search ............ 126/441, 417, 450, 449, 126/418

[56] References Cited

U.S. PATENT DOCUMENTS

| | | | |
|---|---|---|---|
| 2,303,125 | 11/1942 | Knight. | |
| 2,680,437 | 6/1954 | Miller | 126/441 |
| 3,951,129 | 4/1976 | Brantky, Jr. | 126/441 |
| 4,220,139 | 9/1980 | Ramsden | 126/441 |
| 4,237,867 | 12/1980 | Bauer. | |
| 4,257,396 | 3/1981 | Reinert. | |
| 4,270,517 | 6/1981 | Stephens. | |
| 4,274,395 | 6/1981 | Bangs. | |
| 4,381,333 | 4/1983 | Stewart et al.. | |
| 4,581,284 | 4/1986 | Eggert et al.. | |

FOREIGN PATENT DOCUMENTS

| | | |
|---|---|---|
| 1913901 | 4/1970 | Fed. Rep. of Germany. |
| 2629086 | 1/1978 | Fed. Rep. of Germany. |
| 3228364 | 2/1984 | Fed. Rep. of Germany. |
| 3420118 | 12/1985 | Fed. Rep. of Germany. |
| 2201373 | 9/1988 | United Kingdom. |

OTHER PUBLICATIONS

K. Mutze: "ABC der Optik", 1961 VEB Ausgabe (Leipzig, DD) pp. 735-736.

Primary Examiner—Larry Jones
Attorney, Agent, or Firm—Oblon, Spivak, McClelland, Maier & Neustadt

[57] ABSTRACT

A device for protecting the surfaces of objects from the effects of radiation, particularly highly concentrated solar radiation, is produced by utilizing the property of quartz glass not to absorb any radiation in the range of the solar spectrum. When the quartz glass is impinged upon by sunlight, the major part of the radiation, regardless of the thickness of the quartz glass body, is transmitted by the latter, and a small portion of the radiation (<10%) is reflected at the surface. By superimposing a plurality of quartz glass bodies, the required radiation protection is produced in that the preponderant portion of the radiation is reflected stepwise in this way. The quartz glass may take the form of plates, of fibers interlaced into a batting, or of a fabric made of quartz glass filaments.

8 Claims, 4 Drawing Sheets

RADIATION SHIELD

BACKGROUND OF THE INVENTION

This invention relates to radiation technology, and more particularly to a device for protecting the surfaces of objects from the effects of radiation, especially from the effect of concentrated solar radiation, of the type having means for covering the surface to be protected.

DISCUSSION OF THE BACKGROUND

Particularly in solar thermal power plants, sun rays are concentrated on a small surface with the aid of a plurality of reflectors. This concentrated solar radiation is aimed at the radiation input of a radiation receiver for the purpose of converting the radiation into heat. Here the solar radiation reaches a concentration 1,500 times that of the original incident radiation, or more. If such highly concentrated sun rays act upon an object other than the radiation receiver through which a heat carrier is flowing, the radiation is absorbed at the surface of the object, and such powerful heat is thereby released that in all known cases the result is thermal destruction of the irradiated parts.

Objects can basically be protected from the effects of radiation through reflection or absorption of the radiation. In the case of prior art devices such as reflector foils, reflection and absorption are generally superimposed, there being a smaller proportion of absorption. However, prior art devices for covering the surface to be protected absorb so much radiant energy that in the case of impingement by the aforementioned highly concentrated solar radiation, the covering means are destroyed by heat.

SUMMARY OF THE INVENTION

It is therefore an object of this invention to provide an improved device for protecting the surface of an object from the effects of particularly highly concentrated solar radiation.

To this end, in the protective device according to the present invention of a type initially mentioned, the covering means contain, for stepwise reflection of the radiation, a number of bodies of quartz glass exposed to the radiation and disposed in series.

The quartz glass bodies may take the form of a number of superimposed quartz glass plates, of fine quartz glass fibers interlaced into a batting, or of several layers of quartz glass filaments woven into a fabric.

BRIEF DESCRIPTION OF THE DRAWINGS

Preferred embodiments of the invention will now be described in detail with reference to the accompanying drawings, in which.

DESCRIPTION OF THE PREFERRED EMBODIMENTS

Figure 1:
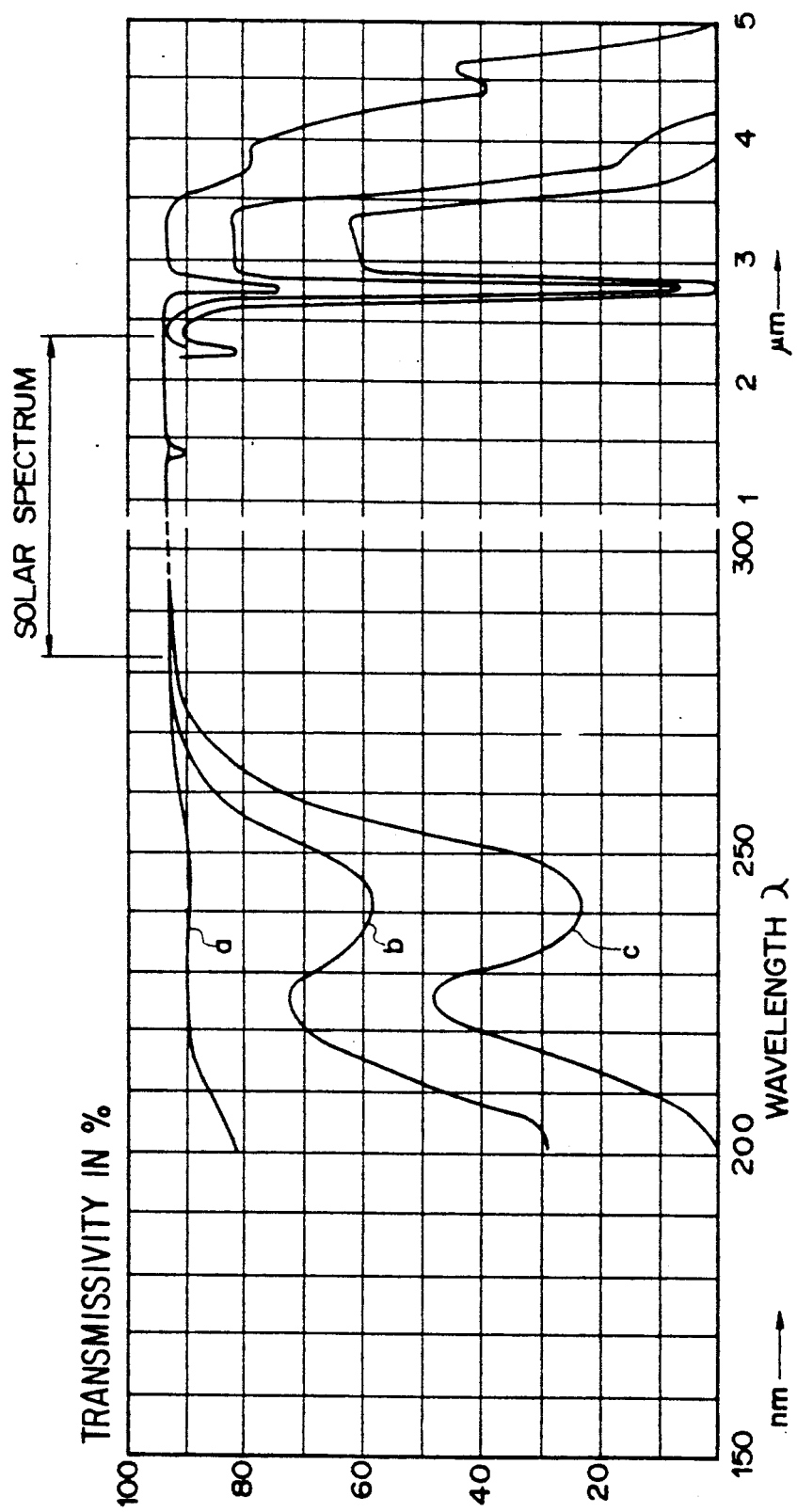
FIG. 1 is a graph showing the transmissivity of quartz glass plates of different thicknesses to electromagnetic radiation in the range from infrared to ultraviolet, plotted over the wavelength.

The operating principle of the inventive device is predicated upon the relation shown in FIG. 1. This graph shows the transmissivity to electromagnetic waves in the region of the solar spectrum through quartz glass plates of different thicknesses. Curve a indicates the trend for a thin quartz glass plate. The thickness of the quartz glass plate increases in the case of curves b and c. It will be recognized that in the range of the solar spectrum, the transmissivity is the same for all the thicknesses of quartz glass plates considered, i.e., the transmissivity is independent of the thickness of the particular quartz glass plate. The explanation of this circumstance is that quartz glass does not absorb any radiation at all within the solar spectrum. Since the quartz glass absorbs no radiation, it is also unable to convert the energy of solar radiation into heat. It is apparent from the state of affairs depicted in FIG. 1 that the preponderant portion within the solar spectrum passes unhindered through the glass plate. Since no absorption at all takes place, the portion of the radiation ($<10\%$) not passing through the quartz glass plate is reflected at the surface of this plate.

Figure 2:
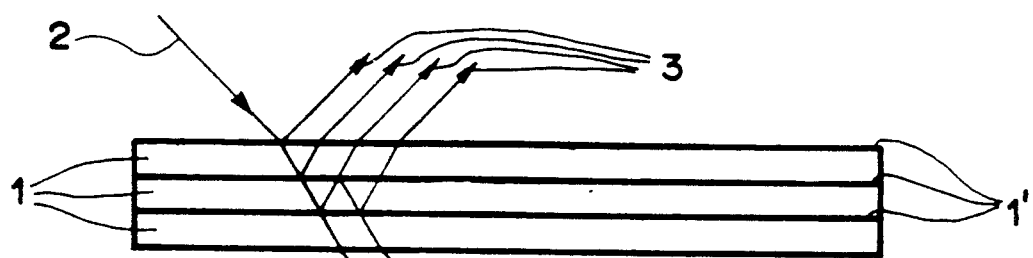
FIG. 2 is a diagram of the path of the rays for a number of superimposed quartz glass plates impinged upon by radiation.
Figure 3:
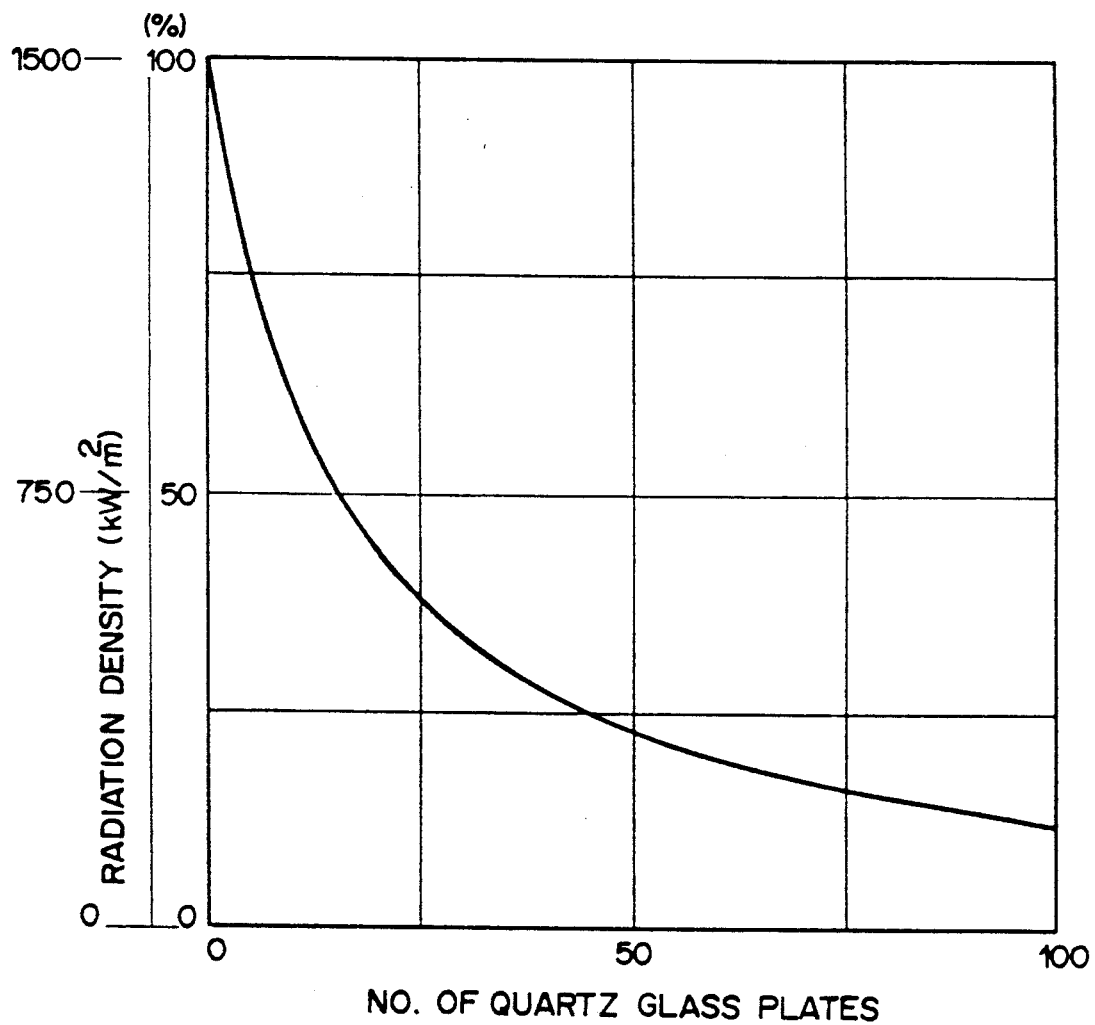
FIG. 3 is a graph showing the decrease in radiation density based upon the reflection of rays depicted in FIGS. 1 and 2, plotted over the number of superimposed quartz glass plates.

FIG. 2 shows the path of the rays for solar radiation passing without absorption through quartz glass, taking as an example a number of stacked quartz glass plates. It will be seen that a portion 4 of the incident radiation 2 is reflected at the top boundary surface 1' of the respective quartz glass plate 1. A portion of the reflected radiation 3 is in turn reflected in the opposite direction at the bottom boundary surface and passes through the plate as reflected radiation 4. The relation depicted in FIG. 2 could be represented in stepwise continuation for a large number of quartz glass plates. As the number of quartz glass plates increases, an increasingly greater portion of the incident radiation is reflected, so that the density of the transmitted radiation decreases to the same extent. This relation is shown in FIG. 3. It will be seen that when the number of stacked quartz glass plates is sufficient, only radiation of slight density still passes through this arrangement of quartz glass plates. The portion of the radiation not passing through the arrangement of quartz glass plates is reflected, i.e., no radiation at all is absorbed, and consequently, neither is any energy converted into heat.

One embodiment of the invention comprises a number of stacked quartz glass plates suited to the intensity of the incident radiation and to the radiation density still permissible at the surface of the object to be protected from the effects of radiation.

Another embodiment of the invention contains the quartz glass bodies necessary for reflection of the radiation in the form of fine quartz glass fibers interlaced to produce a batting. The reflection phenomena occurring on the individual fibers of the quartz glass batting correspond to those shown in FIG. 2 for flat plates. Unlike the relation depicted in FIG. 2, the rays are reflected in various directions when quartz glass batting is used. With a layer of batting 1-2 cm thick, composed of quartz glass fibers from 5 to 30 micrometers in diameter, solar radiation concentrated about 1,000 times can already be kept away from the surface under the layer of batting to an extent which is sufficient for all practical purposes.

Figure 4:
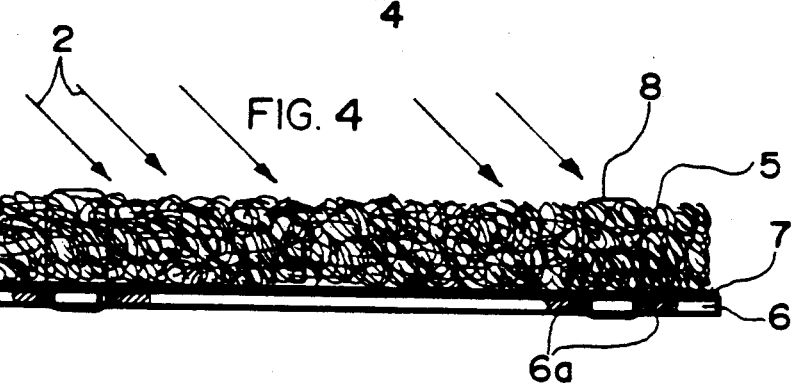
FIG. 4 is an elevation of a device utilizing quartz glass batting for protecting the surfaces of objects from the effects of radiation.

In the embodiment illustrated in FIG. 4, a layer of quartz glass batting 5 is disposed on a support 6. The purpose of support 6, e.g., a steel plate, is to ensure the mechanical strength of the article. For reflecting the residual radiation transmitted through quartz glass batting 5, an insulating foil 7, preferably aluminum foil, is provided between batting 5 and support 6. Batting 5 is preferably secured to support 6, with reflective foil 7 between the two, by means of filaments 8 made of quartz glass fibers, passing through bores 6a in support 6 so that the ends of the quartz glass filament can be connected to form a loop. This way of securing the quartz glass batting by means of quartz glass filaments ensures that no radiation is absorbed even by the securing elements exposed thereto. Support 6 may also be made of a material having low rigidity so that the inventive device can more easily be adapted to the surface contours of a non-flat object, or so that the device can be rolled up when not in use.

Figure 5:
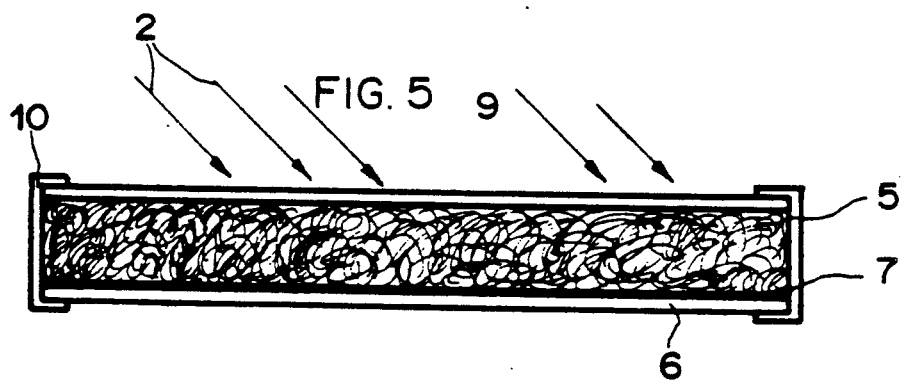
FIG. 5 is an elevation of a device similar to that of FIG. 4, but covered with a quartz glass plate.

FIG. 5 shows an embodiment of the invention corresponding to that described in connection with FIG. 4, but in this case there is a quartz glass plate 9 disposed in front of the quartz glass batting, in the direction of radiation, for preventing particles of dirt from penetrating the fiber structure of quartz glass batting 5. The device illustrated in FIG. 5 is held in a frame 10 which is situated outside the area of radiation impingement and may thus be made of any desired material.

Figure 6:
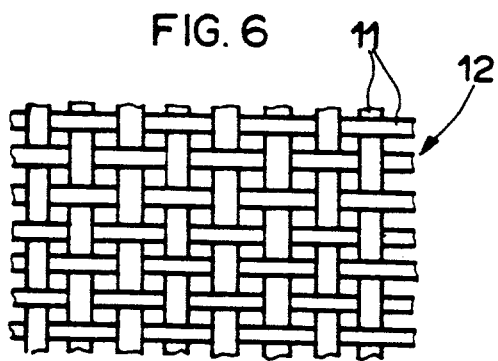
FIG. 6 is a fabric of quartz glass filaments for producing a protective device according to the present invention.

In yet another embodiment of the invention (FIG. 6), the quartz glass bodies necessary for reflecting the radiation take the form of a plurality of superimposed layers of quartz glass filaments 12 woven into a fabric 11. Such an embodiment has relatively high mechanical flexibility together with high resistance to tearing.

For the complete absorption of highly concentrated radiation, it is necessary to utilize radiation shields, e.g., of quartz glass batting, similar to the construction shown in FIG. 4, but in which the covering of quartz glass batting must have considerable thickness. The relation for the requisite thickness of the batting may easily be gathered from the graph of FIG. 3. Since the radiation density decreases asymptotically with the number of quartz glass bodies, this results theoretically in an infinitely large number of reflective quartz glass bodies in order to reflect the radiation completely. When a radiation shield having a quartz glass batting covering of a practical thickness is used, there may penetrate down to the support, if this radiation shield is impinged upon by extremely highly concentrated radiation, a residual radiation which is so great that absorption thereof leads to thermal overloading of the support and possibly of the covering quartz glass batting as well. In order to avoid this, without having to use impractically thick layers of quartz glass batting, a particularly advantageous design of the invention provides for the radiation shield to be disposed on a liquid-cooled support.

Figure 7:
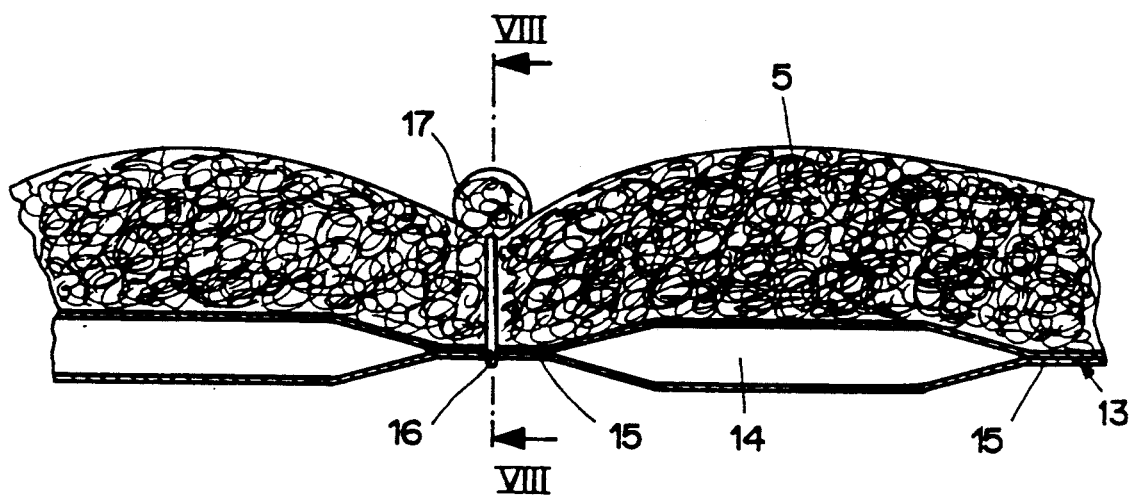
FIG. 7 is a cross-section through a device similar to that of FIG. 4, but affixed to a water-cooled supporting surface.
Figure 8:
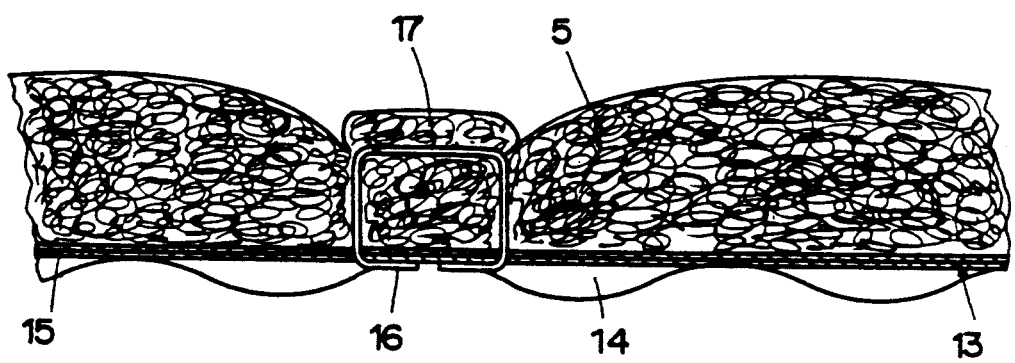
FIG. 8 is a longitudinal section taken along line VIII—VIII of the water-cooled device of FIG. 7.

Such a liquid-cooled arrangement is shown in section in FIGS. 7 and 8.

In the radiation shield illustrated in FIG. 7, quartz glass batting 5 is seen to be disposed on a support 13. In this instance, support 13 is provided with ducts 14 through which a heat carrier, e.g., water, flows. This heat carrier circulates in a cycle which includes an appropriate heat exchanger for transmission of the heat absorbed in support 13. This support may, for example, be made of halves of stainless steel sheeting which are shaped in such a way that when the two halves are put together, they form flow ducts 14 and duct partitions 15.

Batting 5 is secured to support 13 with the aid of wire staples 16, for example. These staples are preferably made of heat-resistant wire. On the side facing the radiation, wire staple 16 is provided with an additional radiation protection 17, e.g., by wrapping the projecting part of the wire with quartz glass wool. Wire staple 16 fits into bores made in the area of partitions 15 of support 13 and thus establishes the connection between the covering of quartz glass batting 5 and support 13.

FIG. 8 shows a longitudinal section through the device illustrated in FIG. 7. It will be seen that the lower steel-sheet half of support 13 is corrugated. This creates turbulence in the flow of heat carrier in the cooling duct and thus leads to improved heat absorption. Also clearly to be perceived in this longitudinal section is the attachment of quartz glass batting by means of wire staple 16, the ends of which are bent beneath support 13 for securing the quartz glass wool.

Quartz glass fabric and quartz glass batting may also be processed into textiles for protection against the effects of radiation. Such textiles are suited for the protection of surfaces of any shape of apparatus, but also of human bodies against the effects of highly-concentrated radiation and flashes of light.

In all embodiments of the invention, it is possible for surfaces to be successfully protected from the effects of radiation, particularly solar radiation in virtually unlimited concentration, by appropriate selection of the thickness of the protective device.

Obviously, numerous modifications and variations of the present invention are possible in light of the above teachings. It is therefore to be understood that within the scope of the appended claims, the invention may be practiced otherwise than as specifically described herein.

What is claimed is:

1. A device for protecting the surfaces of the objects from the effects of radiation, especially from the effects of concentrated solar radiation, which comprises:
    means for covering the surface to be protected, wherein the means for covering the surface comprises a plurality of quartz glass bodies for being exposed to the radiation and being disposed in series for stepwise reflection of the radiation wherein said quartz glass bodies comprise quartz glass fibers interlaced to form a batting.

2. The device of claim 1, further comprising a quartz glass plate covering said quartz glass bodies for preventing contamination from outside.

3. A device for protecting the surfaces of objects from the effects of radiation, especially from the effects of concentrated solar radiation, which comprises:
    means for covering the surface to be protected, wherein the means for covering the surface comprises a plurality of quartz glass bodies, said bodies being provided for being exposed to the radiation and being disposed in series for stepwise reflection of the radiation wherein said quartz glass bodies comprise a plurality of layers of quartz glass filaments woven into a fabric.

4. The device of claim 3, further comprising a quartz glass plate covering said quartz glass bodies for preventing contamination from outside.

5. A device for protecting the surfaces of objects from the effects of radiation, especially from the effects of concentrated solar radiation, which comprises:
   means for covering the surface to be protected, wherein the means for covering the surface comprises a plurality of quartz glass bodies for being exposed to the radiation and being disposed in series for stepwise reflection of the radiation;
   support means for absorbing mechanical forces, said quartz glass bodies being disposed on said support means for absorption of internal and external mechanical forces wherein said quartz glass bodies and said support means each include one or more holes; and
   a plurality of quartz glass filaments respectively passing through said holes and knotted into loops for securing said quartz glass bodies to said support means.

6. The device of claim 5, wherein said support means further includes a plurality of ducts for receiving a heat carrier for exhausting heat.

7. A device for protecting the surface of objects from the effects of radiation, especially from the effects of concentrated solar radiation, which comprises:
   means for covering the surface to be protected, wherein the means for covering the surface comprises a plurality of quartz glass bodies for being exposed to the radiation and being disposed in series for stepwise reflection of the radiation;
   support means for absorbing mechanical forces, said quartz glass bodies being disposed on said support means for absorption of internal and external mechanical forces, wherein said quartz glass bodies and said support means each include one or more holes, and
   a plurality of wire elements respectively passing through said holes and knotted into loops for securing said quartz glass bodies to said support means, the portions of said wire elements exposed to radiation being covered by quartz glass batting for protecting said wire elements against overheating by radiation.

8. The device of claim 7, wherein said support means further includes a plurality of ducts for receiving a heat carrier for exhausting heat.

* * * * *